United States Patent [19]
Berndt

[11] 3,876,310
[45] Apr. 8, 1975

[54] SELF-REFERENCING ALIGNMENT SYSTEM FOR AUTOMOBILE WHEELS AND THE LIKE

[76] Inventor: Wolf-Dieter Rudolph Berndt, 705 S. Riverside Dr., Neptune, N.J. 07753

[22] Filed: Nov. 13, 1973

[21] Appl. No.: 415,403

Related U.S. Application Data

[63] Continuation-in-part of Ser. No. 246,473, April 21, 1972, abandoned.

[52] U.S. Cl. ............................................. 356/155
[51] Int. Cl. .................................... G01b 11/26
[58] Field of Search ..................................... 356/155

[56] References Cited
UNITED STATES PATENTS
2,667,805   2/1954   Carr ................................. 356/155
3,758,213   9/1973   MacPherson et al. .............. 356/155

Primary Examiner—Ronald L. Wibert
Assistant Examiner—Paul K. Godwin

[57] ABSTRACT

Method and apparatus for aligning automobile wheels and the like. An optical assembly comprising two mirrors is mounted to the wheel to be aligned. A beam of collimated, coherent radiation is reflected from the centrally mounted mirror in the optical assembly, while the automobile is on the ground, and the point of interception with a display chart is noted. Next, the automobile is raised off of the ground and the chart and wheels are moved so that the beam which is reflected from the centrally mounted wheel mirror again intercepts the chart at the same position to complete a ground reference step. The wheel mountings are now adjusted to center the beam to desired specifications, the second mirror in the optical assembly being used only to check caster.

10 Claims, 4 Drawing Figures

SELF-REFERENCING ALIGNMENT SYSTEM FOR AUTOMOBILE WHEELS AND THE LIKE

CROSS-REFERENCES TO RELATED APPLICATIONS

This is a continuation-in-part of my copending application Ser. No. 246,473, filed Apr. 21, 1972 now abandoned.

BACKGROUND OF THE INVENTION

1. Field of the Invention

Broadly speaking, this invention relates to methods and apparatus for adjusting the steering and wheel alignment of motor vehicles, and the like. More particularly, in a preferred embodiment this invention relates to methods and apparatus for aligning the wheels of a motor vehicle by means of a translation of the ground reference coordinate axis and a beam of collimated, coherent radiation.

2. Discussion of the Prior Art

As is well known, from time to time it becomes necessary to align the front end of an automobile, or similar vehicle. Such alignment typically includes adjustment of the toe-in, camber and caster of the steering mechanism.

Several devices to perform these adjustments are commercially available, ranging from fairly simple mechanical devices to complex optical devices. Examples of such devices are described in U.S. Pat. Nos. 2,496,324; 2,667,805; 2,470,090; 2,641,957; 2,706,427; and 2,765,701. Unfortunately, the prior art devices suffer from one or more defects, such as lack of accuracy, high cost, the need for frequent adjustment, restriction of the use of a work area to alignments only and the necessity of employing highly skilled labor to perform the adjustments.

SUMMARY OF THE INVENTION

Accordingly, it is an object of this invention to provide methods and apparatus for aligning the front end of automobiles and the like, which are relatively inexpensive, highly accurate, easy to adjust, and which may be built independently of the lift used, and which require only semiskilled labor to operate.

To attain this, and other objects, one embodiment of the invention comprises a method of aligning the wheels of an automobile and the like. First, a beam of collimated, coherent radiation is reflected from a mirror to pass through an aperture in a graphic display chart and impinge upon a mirrored surface fastened to the wheel of the automobile to be aligned, while the automobile is resting on the ground. This beam is then reflected from the mirrored surface to impinge upon the graphic display device. The point of impingement of the beam on the graphic chart is recorded on said graphic chart to establish a ground reference point indicative of the true alignment of the wheels of the automobile with reference to the ground.

Next, the automobile is raised off the ground. A second mirror is then inserted in the beam path to bend the beam so that it is reflected again from the mirrored surface attached to the wheel. The display chart and wheel are positioned to allow the beam reflected from the mirror surface, attached to the wheel, to impinge on the same previously recorded reference point on the graphic display chart. Adjustments are then made to the wheel mounts to correct the misalignment which can easily be read off the display chart.

The self-referencing alignment method utilizes a ground reference and a translation of that reference to the dynamic situation that exists when the weight of the vehicle is off the wheels. First, as described, a ground reference point on the graphic display chart is recorded. This establishes a point on the chart with reference to the ground. This point is indicative of true alignment of the wheels with the wheels on the ground and the weight of the automobile fully on the wheels. Once the wheels are raised off of the ground, the chart is positioned the same horizontal distance from the wheel as before. The chart is also moved vertically and the wheels turned in or out until the beam again impinges on the previously recorded ground reference point. The wheel is then immobilized for alignment adjustments. The vertical movement of the chart and the turning in or out of the wheels compensates for the disturbance of the ground reference point by the action of the suspension system as the vehicle is raised. Thus a reference point indicative of true wheel alignment is preserved and can now be utilized for alignment measurement.

A beam of coherent, collimated radiation (e.g., from a c.w. laser) is employed with the self-referencing alignment method and allows greater system versatility and is an improvement over existing wheel alignment methods. The coherent, collimated radiation is a narrower and more well defined beam thus allowing greater accuracy than previous non-coherent, non-collimated sources. Previously, a graphic display chart was located adjacent the source of the light beam, since maximum optical path length was required to achieve a usable size beam and a beam which was sufficiently sensitive to misalignment angles. However, use of a coherent, collimated beam allows the chart to be adjacent to the wheel, and not the beam source. This feature thus allows an operator to read the misalignment as he physically adjusts the wheel to correct for said misalignment.

To practice the above method, one illustrative apparatus comprises a source of a beam of coherent, collimated radiation and means, in the path of the beam, for bending the beam into a lower and an upper, raised beam. A graphic display having a central aperture through which the beam may pass is also provided. There is also provided an optical assembly for mounting to the wheel of the automobile to be aligned. The optical assembly consists, for example, of two adjacent mirrors, the outer one at an angle of 20° with respect to the coaxially mounted mirror. The lower and upper beams, in each instant of usage, are reflected from the wheel-mounted mirrored surfaces, after passage through the aperture, to impinge upon the graphic display chart.

DETAILED DESCRIPTION

Figure 1:
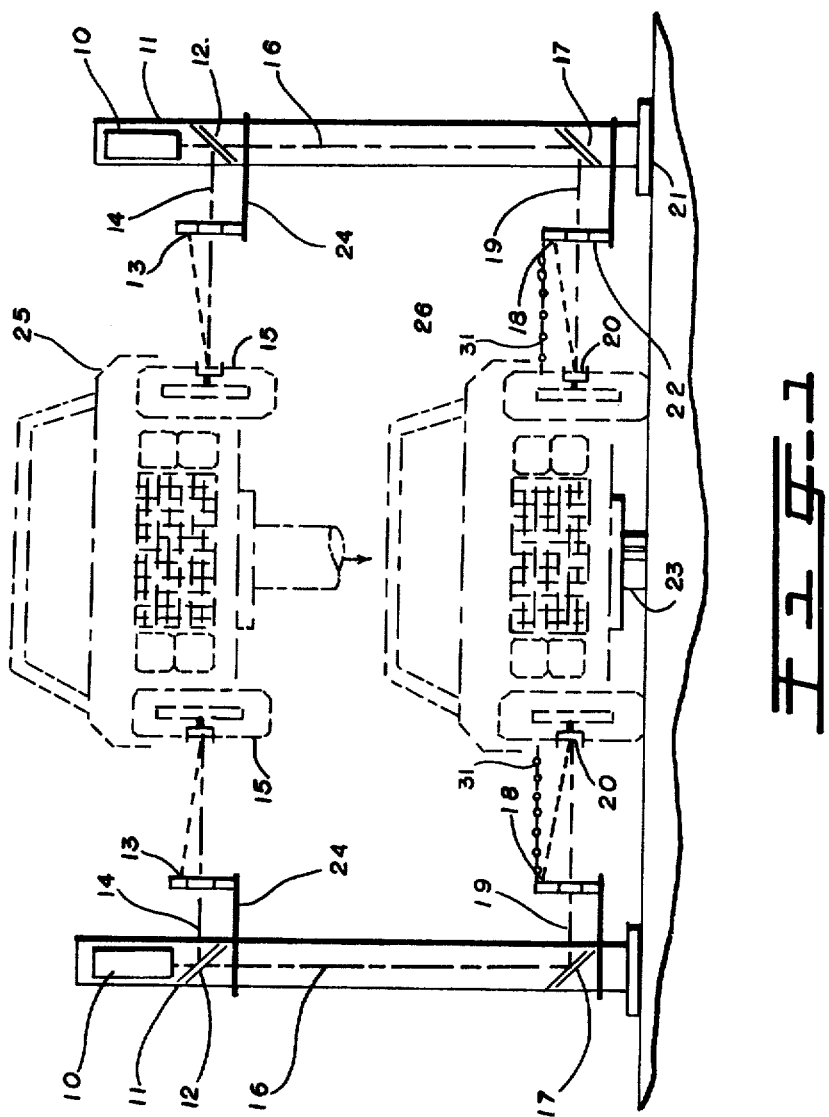
FIG. 1 is a partially diagrammatic view of a first embodiment of the invention.

FIG. 1 illustrates the operating environment of the invention. Since the illustrative embodiment is symmetrical, only one side thereof will be described in detail.

A beam source 10, for example a 1 mw HeNe c.w. laser, is mounted in a vertical, tubular upright 11. For the lower beam 19, the output of the beam source 10 is reflected from an adjustable 45° mirrored surface 17, thence through the central aperture of a graphic display chart 22. The chart 22 is supported by a suitable holder 24 itself connected to tubular upright 11 in such a manner to allow the chart 22 to move vertically and horizontally. A chain 31, shown only in the lower chart position, is used to obtain the correct horizontal car-chart distance, thus permitting only one graphic chart 22 be utilized for various vehicles. The lower beam 19, having passed through the graphic display chart aperture, falls upon an optical assembly 20 fastened to the wheel 15 of the automobile 25 by means to be explained more fully herebelow. As shown, beam 19 is reflected from the optical assembly 20 to permit the beam 19 to strike the display chart 22. This also will be discussed in more detail herebelow, with particular reference to FIG. 2.

Figure 4:
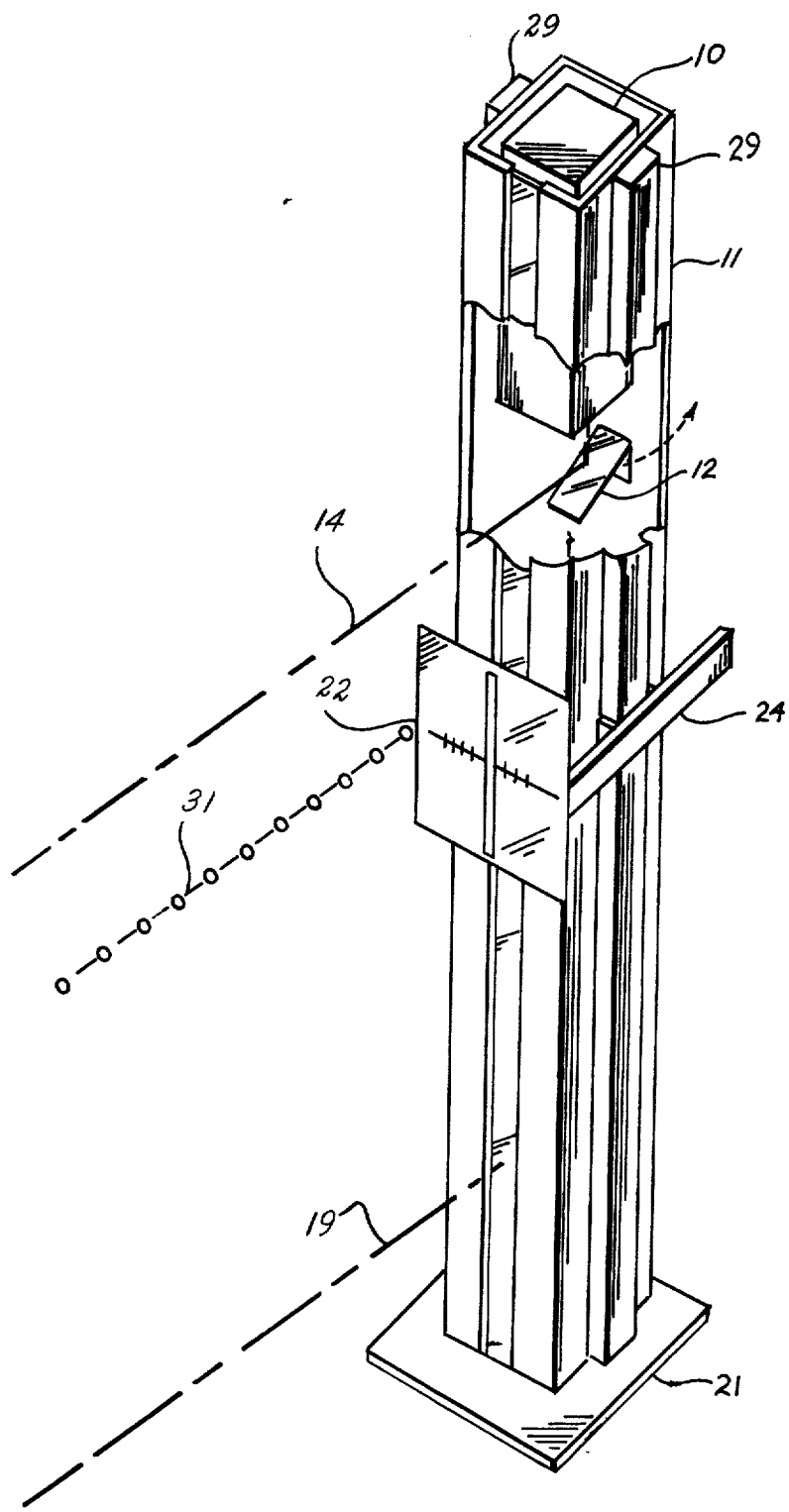
FIG. 4 is a partially diagrammatic view of one side of the invention.

The automobile 25 is supported in a conventional manner by a hydraulic chassis lift 23, or other similar device. The lift 23 is initially in its lowermost position so that the automobile wheels 15 rest firmly on the ground. As discussed, the vertical tubular upright 11 has a lower vertically adjustable 45° mirrored surface 17 to adjust the beam 19 so that it falls on the optical assembly 20. Referring now to FIG. 4, the tubular upright 11 also has another 45° mirrored surface 12, which is inserted by rotation, into the beam path to bend the beam into the upper beam position 14 to fall on the now raised optical assembly 20 when the lift has been raised to its uppermost position.

Figure 2:
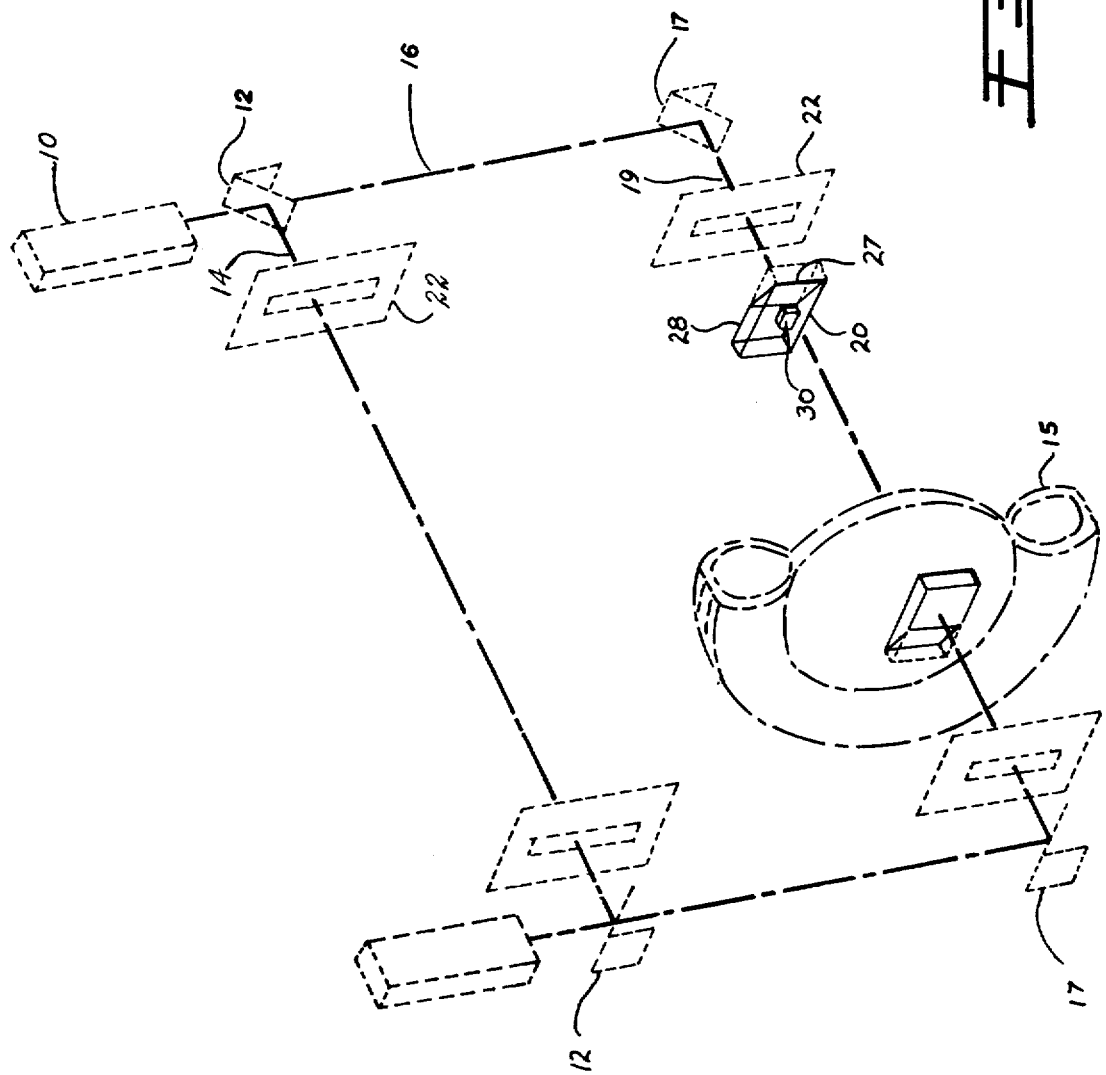
FIG. 2 is an isometric view of the optical path of the embodiment shown in FIG. 1.

Referring now to FIG. 2, which shows the optical path in more detail, optical assembly 20 comprises two adjacent mirrors 27 and 28 and a magnet 30. The centermost mirror 28 is parallel to the mounting surface, and the mirror 27 is mounted at an angle $\Phi$, where $\Phi$ is from 15° to 25° and preferably 20° to the rear of the center mirror 28.

The magnet 30 allows attachment of the optical assembly 20 to the spindle of the wheel 15. An alternative method is to mount the optical assembly 20 on a pair of rods, the ends of which are fastened to the rim of the wheel by suitable clips. One skilled in the art will appreciate that many other mounting techniques may be employed to mount the mirrors to the wheels.

Figure 3:
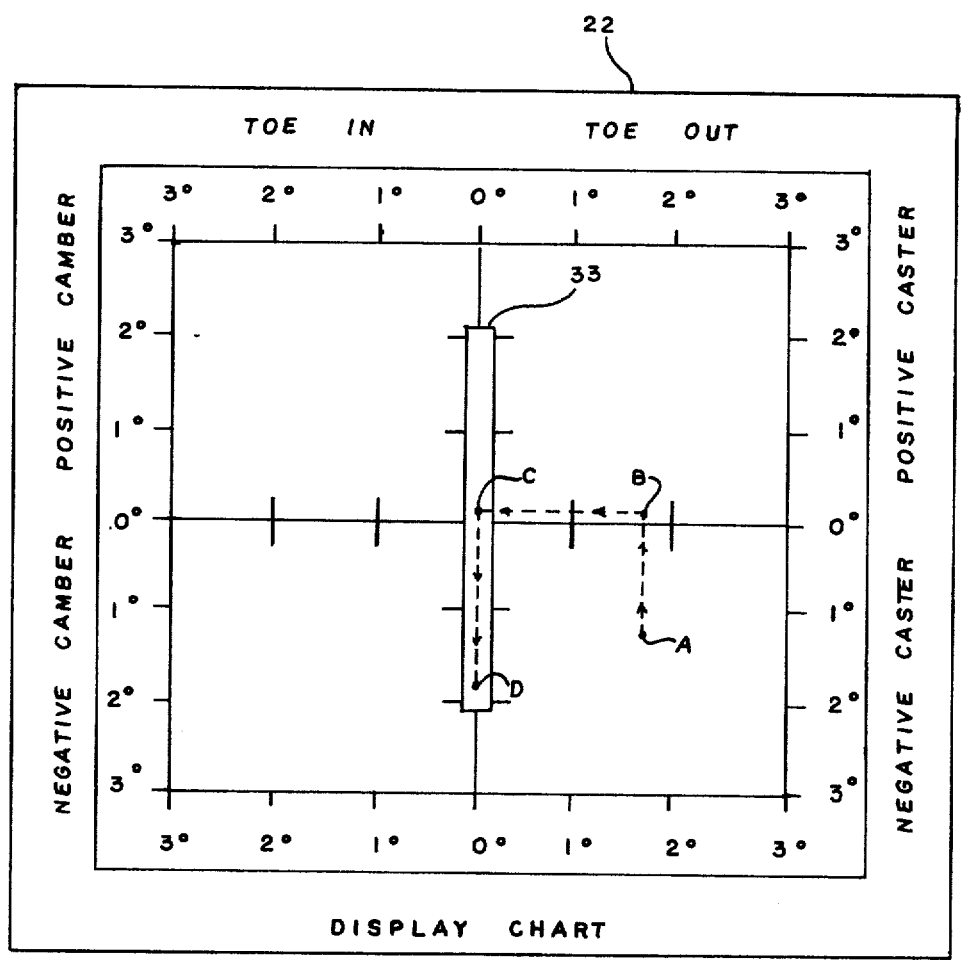
FIG. 3 is a plan view of the graphic display chart shown in FIGS. 1 and 2.

FIG. 3 illustrates the graphic display chart 22 in greater detail. As shown, the chart 22 includes a centrally located slot aperture 33 through which the beam passes. Around the periphery are markings (in degrees) for determining the degree of toe-in or toe-out, positive and negative caster, and positive and negative camber.

In use, the automobile to be aligned is driven onto the hydraulic lift and roughly aligned with the beam system. The lift is not activated yet, however. Then the beam sources are activated and the wheels of the automobile set straight ahead. The lower 45° mirror may have to be raised or lowered to intercept the beam, depending on the height of the automobile axle from the ground. Assume that the beam, after passing through aperture 33 and being reflected from the center mirror 28, impinges on the display chart 22 at point A. The location of point A is marked on the chart, for example, with a grease pencil. Then the automobile is raised by means of the hydraulic lift, until the wheels of the automobile are no longer in contact with the ground and the wheel is centered opposite the upper 45° mirror 12.

Depending upon the make of the automobile, when the wheels 15 leave the ground, they will either toe-in or toe-out, due to the suspension system of the automobile. Ordinarily, no weight on the wheels would make accurate adjustments impossible. However, according to the invention, the upper 45° mirror 12 is rotated into position so that the beam 14 is reflected from the optical assembly. The chart 22 is now adjusted vertically and the wheels positioned by turning them in or out, so that the beam 14 which is reflected from the center mirror 28 impinges on the display chart 22 at point A, the same point A as was marked previously. The wheel 15 is immobilized during this process. A translation of reference axis has now occurred from a ground reference to a dynamic reference. Now alignment of the front end can take place according to automobile specifications.

The following procedure will discuss alignment for zero toe-out, camber, caster. First, camber is adjusted by making the appropriate mechanical adjustment to the automobile. While observing the display chart, corrections are made until the beam has moved from point A to the horizontal axis denoting 0° camber, for example, to point B. The automobile wheels are now aligned for 0° camber and will be aligned perfectly vertical when the automobile is resting on the ground.

However, since point B is not at the exact center of the display chart, there is evidently some toe-out. This must be corrected by performing mechanical adjustments to the automobile to bring point B inwards to dead center, for example, to point C. Now the wheel is aligned for 0° toe-out.

To check caster, the automobile wheel 15 is turned until the beam 14 is reflected from mirror 27 of the optical assembly 20 and is positioned on a vertical line running through point C. If the caster is zero degrees, the beam would remain centered at point C. More generally, however, the beam will be vertically either above or below point C, for example, at point D. By making the appropriate mechanical adjustments, while observing the display chart, caster error is eliminated by bringing the beam back up to point C. The wheel is now aligned for camber, caster, and toe-out of zero, and will be in perfect alignment when returned to the ground. Using the preceding method, the wheel can be aligned to automobile specifications in a similar manner. While alignment of only one wheel has been described, the alignment of the other wheel is identical and is normally performed at the same time.

Points C and D are shown as smaller than the dimensions of slot 33, but in practice, the beam will spread far enough, due to optical path length, that they will appear on either side of the slot.

Of course, a single beam source and a suitable optical path could be substituted for the two beam sources shown. For example, a single double-ended beam source, buried in a trap door beneath the automobile, and a pair of mirrors could be substituted for beam sources 10.

To check the alignment of the collimated, coherent upper beams 14, a sheet is inserted in the beam paths equidistant from the two vertical, tubular uprights 10. If the beams appear on either side of the sheet back to back at the same point, the upper beams 14 are aligned. A similar procedure can be used for the lower beams 19.

One skilled in the art can make various changes and substitutions to the arrangement of parts shown without departing from the spirit and scope of the invention.

What is claimed is:

1. A method of aligning at least one wheel of a vehicle, comprising the steps of:
   projecting a beam of coherent, collimated radiation through an aperture in a display device to impinge upon a mirrored surface affixed to and parallel with said wheel, while the vehicle is resting upon the ground;
   reflecting said beam off said mirrored surface to impinge upon said display device;
   marking the point of impingement of said reflected beam on said display device;
   raising said vehicle so that said vehicle is no longer supported on the ground by said wheel;
   raising said display device through substantially the same displacement that said vehicle experiences during said vehicle raising step;
   projecting a second beam of coherent collimated radiation through said aperture in said display device to impinge upon said mirrored surface;
   reflecting said second beam off said mirrored surface to impinge upon said display device;
   adjusting the height of said display device above ground until the point of impingement of said second beam falls on a horizontal line passing through said marked point of impingement of said first beam;
   rotating the steering column of said vehicle until the point of impingement of said second beam coincides with the marked point of impingement of said first beam; and
   adjusting the mechanical suspension of said wheel for 0° camber while simultaneously observing the point of impingement of said second beam move along a vertical line passing through said marked point of impingement, said adjustment being terminated when said point of impingement falls on the horizontal axis of said display device.

2. The method according to claim 1 comprising the further step of:
   adjusting the mechanical suspension of said wheel for 0° toe-in while simultaneously observing the point of impingement of said second beam move along the horizontal axis of said display device to the center thereof.

3. The method according to claim 2 wherein said mirrored surface includes a portion making an angle of $\Phi°$, where $15° < \Phi < 25°$, to the major reflective surface thereof, said portion being orthogonally oriented to the ground, and the method includes the further step of:
   turning the steering column of said vehicle so that said second beam is reflected off said angled portion of the mirrored surface and the point of impingement of said beam on said display device falls on the vertical axis; and
   adjusting the mechanical suspension of said wheel for 0° of caster while simultaneously observing the point of impingement of said second beam traverse said vertical axis, said adjustment being terminated when said point of impingement coincides with the center of said display device.

4. Apparatus according to claim 3 wherein said automobile is raised by a lift, or the like, above the surface of the ground, the apparatus further comprising:
   means for moving said display device upwardly through substantially the same distance traversed by said vehicle; and
   second means for reflecting said beam so that it passes through said aperture while said display device is in its elevated position, said beam again being reflected off said mirrored surface to impinge upon said display device.

5. Apparatus according to claim 4 further including:
   a hollow, vertically disposed upright, said beam source being located in said upright and directing said beam vertically downwards;
   said first and second reflecting means comprise 45° mirrors in said upright for reflecting said beam outwardly thereof through a longitudinal slot in said upright, said second reflecting means being pivotally mounted to said upright to move out of the path of said beam when said first reflecting means is in use.

6. The apparatus according to claim 5 wherein said first and second 45° mirrors are mounted to said upright for vertical travel therein.

7. The apparatus according to claim 6 wherein said display device moving means is adapted for travel along said upright and includes:
   means for moving said display device horizontally with respect to said upright to compensate for vehicles of differing widths; and the apparatus further comprises:
   measuring means, mounted to said moving means, for ensuring a uniform distance between said display device and said mirrored surface regardless of the particular vehicle being aligned.

8. The apparatus according to claim 7 wherein said mirrored surface comprises two mirrors, the first parallel to the mounting surface and said wheel, and the second making an angle of $\Phi°$ thereto, where $15° < \Phi < 25°$.

9. The apparatus according to claim 8 wherein the entire apparatus is replicated on the other side of the vehicle to align both front or rear wheels of said vehicle simultaneously.

10. The apparatus according to claim 9, including means, translucent to the radiation employed, for aligning the upper and lower pairs of 45° mirrors, said means being inserted into the path of both beams prior to said vehicle being positioned over said lift.

* * * * *